UNITED STATES PATENT OFFICE.

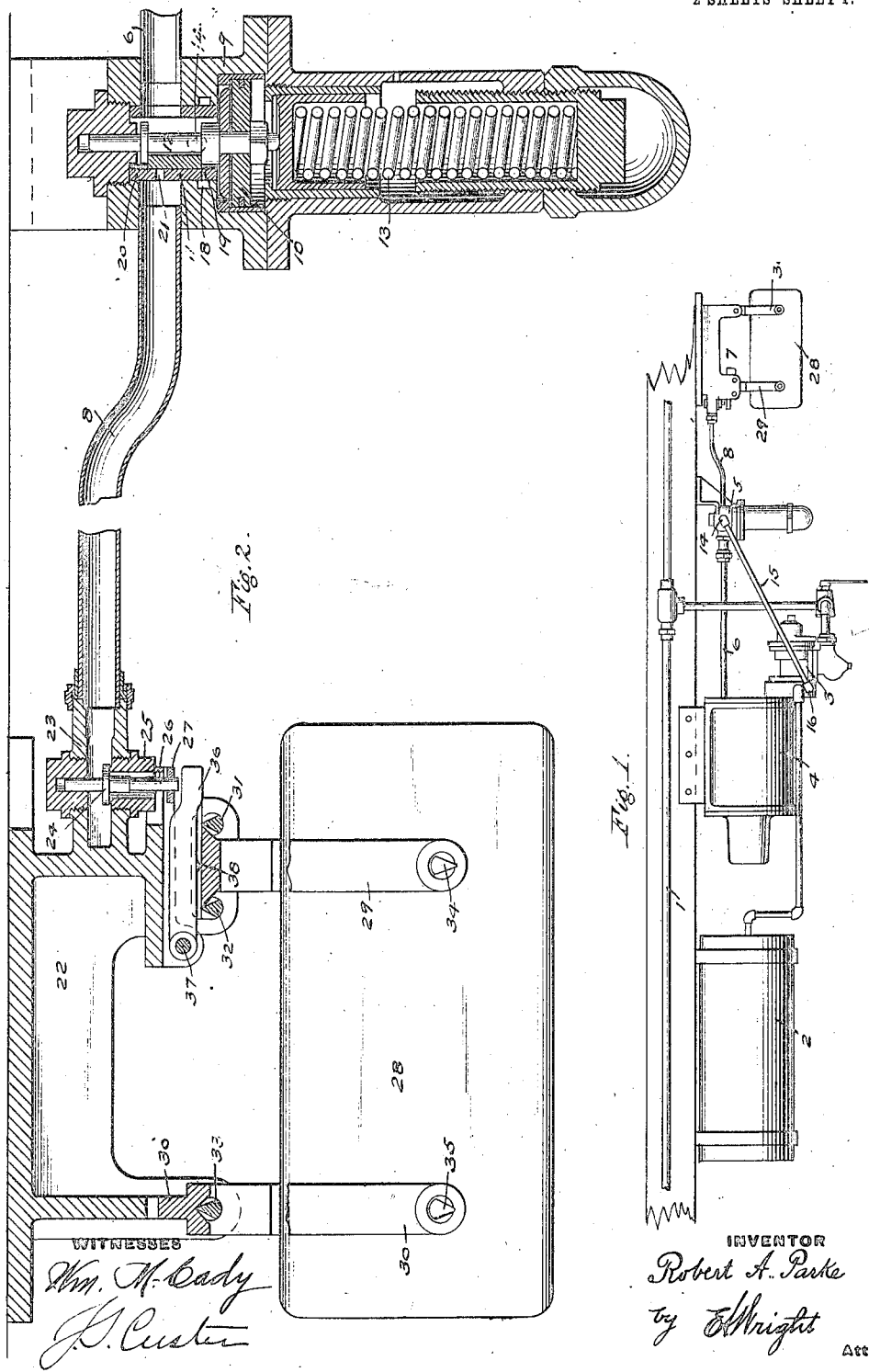

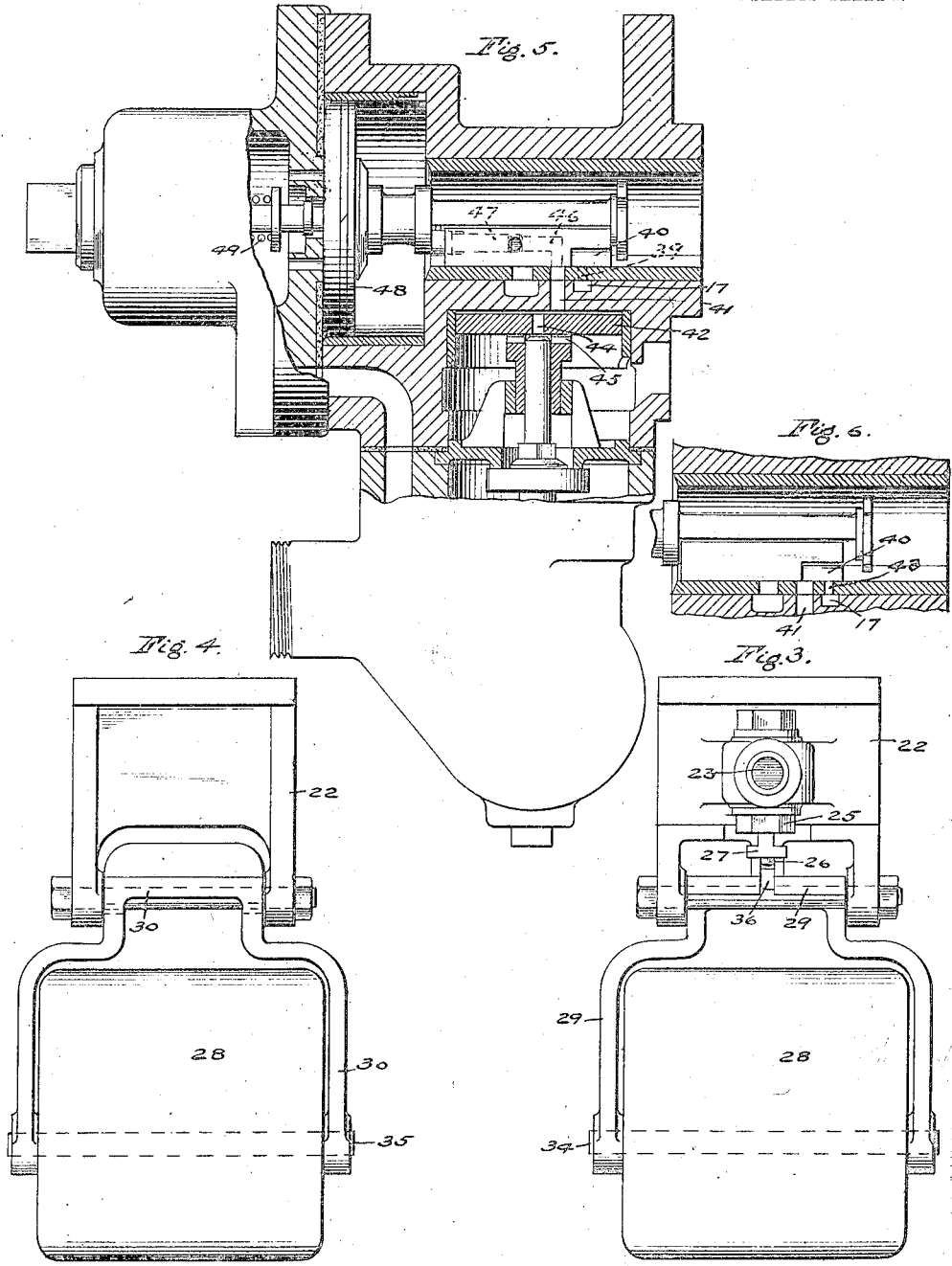

ROBERT A. PARKE, OF PARKE MINES, ONTARIO, CANADA, ASSIGNOR TO THE WESTINGHOUSE AIR BRAKE COMPANY, OF PITTSBURGH, PENNSYLVANIA, A CORPORATION OF PENNSYLVANIA.

HIGH-SPEED BRAKE APPARATUS.

1,057,497.  Specification of Letters Patent. Patented Apr. 1, 1913.

Application filed September 2, 1909. Serial No. 515,895.

*To all whom it may concern:*

Be it known that I, ROBERT A. PARKE, a citizen of the United States, residing at Parke Mines, in the district of Nipissing, Province of Ontario, Dominion of Canada, have invented new and useful Improvements in High-Speed Brake Apparatus, of which the following is a specification.

This invention relates to fluid pressure brakes and more particularly to what is known as the high speed brake which is especially designed for the service of trains which run at very high speeds, and which employs a high emergency brake cylinder pressure for producing a better stopping efficiency.

My present invention is more particularly in the nature of an improvement on that covered by my prior Patent 739918 of September 29, 1903, in which an inertia governor valve mechanism is shown combined with the high speed reducing valve device of prior Patent 506185 of October 3, 1893.

According to this last mentioned patent the service port of the quick action triple valve communicates with the valve chamber of the reducing valve and the brake cylinder through a port controlled by the valve and actuating piston so that when the brake cylinder pressure rises to the desired predetermined maximum for service applications further supply to the brake cylinder is cut off; but in emergency applications the full supply of air from the auxiliary reservoir as well as that vented from the train pipe, is admitted directly through a separate passage to the brake cylinder, and producing a very high pressure therein which is then gradually reduced to a predetermined amount by blowing off through the outlet port of the reducing valve.

With the old standard construction of quick action triple valve as illustrated in the above mentioned patent, if the train pipe pressure should be reduced slightly below the equalizing point in making an excessive reduction, as often happens, the triple valve then moves over to its extreme or emergency position and opens the direct passage from auxiliary reservoir to the brake cylinder. This would produce the objectionable result of admitting an excessively high degree of pressure to the brake cylinder at the time it is desired to limit the same to the predetermined safe maximum degree for slow speeds.

One of the objects of my present invention is to overcome this objection and provide an improved triple valve construction in which the emergency supply passage is separate from the service port but is not adapted to be opened under a gradual reduction in train pipe pressure to any degree for service applications, but is opened only under a sudden reduction in train pipe pressure which moves the triple valve to emergency position by a quick and sudden movement.

Another feature of my invention comprises an improved form of inertia governor device which shall have a greater range of adjustment and operates with more ease and certainty to readily open the discharge valve under the desired rate of retardation but promptly close the same when such rate of retardation is slightly but sufficiently reduced.

These and other features of my invention will be hereinafter more fully described and set forth in the claims.

In the accompanying drawings, Figure 1 is a side elevation representing the general arrangement of a car air brake equipment embodying my invention; Fig. 2 is an enlarged sectional view of the pressure reducing valve and improved inertia governor of Fig. 1, showing the various operating parts of each in detail; Figs. 3 and 4 are opposite end elevations of the inertia governor, Fig. 3 representing the end at which the valve regulating the brake cylinder pressure is operated; Fig. 4 representing the other end at which the inertia governor is supported by the idle lever; Fig. 5 is a longitudinal section of a portion of a quick action triple valve embodying one feature of my improvements and showing the slide valve in the position for a full service application; and Fig. 6 a similar section as that of Fig. 5, but with the slide valve in the position of an emergency application instead of that of full service application.

In Fig. 1 is shown the usual passenger car equipment of a quick action automatic air brake apparatus, consisting of a train pipe 1, auxiliary reservoir 2, triple valve 3 and brake cylinder 4, all of which are of the customary well known construction of the Westinghouse passenger brake system. In addition, a pressure reducing valve 5 is shown connected like that of the Westinghouse high speed brake to the brake cylinder 4 by pipe 6. In addition to these enumerated parts of the Westinghouse high speed brake there is an inertia governor 7 connected by pipe 8 with the reducing valve 5. All these parts are also present and combined in substantially the same way in my high speed brake Patent No. 739918 of September 29, 1903. As in that patent, the pressure reducing valve 5 is more clearly shown in Fig. 2, which comprises a casing 9, containing piston 10 and slide valve 11, secured between collars upon the stem 12 of piston 10. As in the Westinghouse high speed reducing valve, the downward movement of piston 10 and slide valve 12 is regulated by spring 13. As compared with the other reducing valves above referred to, that of Fig. 5 has an additional pipe connection 14, shown in Fig. 2 in dotted lines, and a pipe 15 leading therefrom to the casing of triple valve 16. The triple valve pipe connection 15 communicates with annular passage 17, shown in Fig. 5, by which the air from the auxiliary reservoir must pass to the brake cylinder, (except in emergency applications only, as hereafter described,) through pipe 15 and the reducing valve 5, instead of flowing directly from the triple valve into the brake cylinder, as is customary. The pipe connection 14 of the reducing valve leads, by the annular passage 18, about bushing 20, to port 19, through the bushing 20, thereby connecting with the slide valve chamber of the reducing valve. The port 21, in bushing 20, leading from the slide valve chamber to pipe 8 is rectangular in shape and, as shown in Fig. 2, is normally closed by slide valve 11.

The inertia governor consists of casting 22, which is adapted to be secured by bolts to the framing of the car and contains at one end a chamber 23 connected to pipe 8, in which is located a valve 24, normally resting upon a seat at the upper end of plug 25. Valve 24 is provided with guiding stems above and below, the lower stem 26 passing down through the guide 27 on the lower end of plug 25 and projecting a short distance below it. Casting 22 supports the inertia weight 28, by means of two levers 29 and 30, which are both composed of two arms each, straddling the weights, as shown in Figs. 3 and 4. The lever 29 is supported by means of two fulcrum bolts 31 and 32 secured to casting 22, while lever 30 is supported by a single bolt 33 near the other end of casting 22. These fulcrum bolts 31 and 32 and the supporting bolt 33 are cut away to form a V shaped support, like a blunt knife edge, upon which the levers rest. The weight 28 is similarly supported by means of pins 34 and 35 that extend traversely through the weight and are provided with V shaped ends projecting from both sides, the edge in each case facing downward and supported in corresponding grooves through the lower end of the arms of the levers. Lever 36 is secured at one end by pin 37 to casting 22, while the other end extends horizontally below the lower end of guide stem 26 of valve 24. A short distance is left clear between the end of stem 26 and the lever 36 to permit valve 24 to settle somewhat upon its seat without contact with lever 36. Midway between the centers of the valve stem 26 and pivot pin 37 there is a projecting edge 38 upon the lower face of lever 36, which rests upon the bottom of a groove through the cross head, formed by the upper portion of lever 29, resting upon fulcrum pins 31 and 32. By means of this groove through the cross head the bearing edge of the projection 38 is brought into the same horizontal plane with the supporting edges of fulcrum bolts 31 and 32. It will thus appear that by means of the fulcrum bolts and the cross head construction at the upper end of lever 29, that end of the lever becomes itself a double fulcrum lever for the operation of lever 36. When the lower end of lever 29 is moved in either direction it rotates the upper end about one of the fulcrum bolts 31 or 32 and forces lever 36 upward. The supporting link or lever 30, on the contrary, is merely pivoted at the upper end in the same manner as at the lower end and is equally free to move in either direction.

In my former Patent No. 739918, above referred to, the inertia weight was supported wholly by a single stem having a cross head at the upper end forming a double fulcrum lever, similar to that of lever 29 of Fig. 2. At that time it was believed that the occurrence of the maximum safe brake shoe friction, causing the rate of retardation for which the governor is adjusted to operate, should result in an immediate full opening of the discharge valve 24 by the governor, and the prompt reduction of the pressure in the brake cylinder to a safe minimum, which was secured by the operation of the reducing valve; and that minimum emergency cylinder pressure, being within the limit of safety, for all conditions, was then continued to the end of the stop. The form of inertia governor in that patent was adapted to that requirement, the inertia weight operating to open the valve at the proper time and to thereafter hold it open, at least until after the rate of retardation had fallen materially below that which was initially required to operate the governor. It is true that it was also adapted for such an adjustment that it might open and close again with a comparatively slight reduction of the rate of retardation, but the range of adjustment was found to be so narrow with that construction that it could not be successfully employed for the purpose of the present invention, in which the emergency brake cylinder pressure is controlled wholly by the operation of the inertia governor, the reducing valve having no part whatsoever in such control.

In the operation of the inertia governor device the motive force is due to the inertia of the retarded governor weight operating at the lower end of lever 29. In order to open valve 24 it is necessary to lift so much of the governor weight as is supported by lever 29, in rotating the crosshead, at its upper end, about one of the fulcrum bolts. It is also necessary to overcome the pressure with which valve 24 is held on its seat, which is at that time the full pressure of the air in the brake cylinder, and it will be noted that the resistance thus offered to the opening of the valve by the air pressure upon it is multiplied by two, in its effect upon the crosshead, through the intervention of lever 36. When now the valve has once been opened the air in the chamber 23 and connecting pipe 8 having comparatively free access to the atmosphere discharges more rapidly than it is supplied to pipe 8, through the port 21 in the reducing valve, whereby the air pressure in pipe 8 and chamber 23 becomes materially reduced. The force required to hold valve 24 in the open position is therefore considarably less than that required to initially cause it to open, and in order that the same force shall be required at the lower end of the lever 29 to maintain the valve 24 in its open position, as that required to initially open it, the weight supported by lever 29 must be so adjusted that its increased rotative movement, in the open position of the valve, shall compensate for the reduced air pressure upon the valve in the open position. It was found to be practically impossible to so proportion the device of my former patent with a single weight acting downward upon lever 29 that it shall both supply the requisite valve opening force of inertia and satisfactorily meet this compensating requirement, but by supporting the weight at two points by two levers, and properly proportioning the weight carried by each, the aggregate resistance to the opening movement of valve 24, and that to maintaining it in the open position, may be made practically the same at all times without interfering with the provision of any required operative energy of inertia for imparting opening and closing movement to the valve at the chosen rate of retardation. In this manner the device is easily adjusted to open valve 24 and promptly discharge the air from chamber 23 and the brake cylinder to the atmosphere until the rate of retardation is slightly but sufficiently reduced, whereupon the valve 24 is closed and the discharge of air discontinued.

The operation of the device is as follows: In service applications of the brakes the air pressure in the train pipe is reduced by the engineer in the customary way and the operation of the triple valve opens port 39, shown in dotted lines in the triple valve bushing, in Fig. 5, whereby air from the auxiliary reservoir is discharged through port 39, annular passage 17, and connecting pipe 15, leading to the pipe connection 14 of the reducing valve, and thence by the annular passage 18, about bushing 20, to and through port 19, into the valve chamber, and thence to the brake cylinder by pipe 6. Such discharge of air from the auxiliary reservoir to the brake cylinder continues, in proportion to the reduction in train pipe pressure, until interrupted by the closing of the graduating valve 47 of the triple valve. Additional graduations of air into the brake cylinder may similarly occur, by making further reductions in train pipe pressure until the air pressure in the brake cylinder, pipe 6 and the reducing valve chamber above piston 10, reaches a predetermined limit, for which spring 13 is adjusted, whereupon the spring 13 is compressed and piston 10 descends, together with slide valve 11, and closes port 19. Further discharge of air from the auxiliary reservoir to the brake cylinder is thereby wholly cut off and the maximum air pressure which can be obtained in the brake cylinder in service applications is thereby limited. To release the brakes the engineer restores the air pressure in the train pipe, thereby causing the triple valve to so operate that the air confined in the brake cylinder is discharged to the atmosphere, in the usual way.

In emergency applications of the brakes, by a sudden reduction of air pressure in the train pipe, the triple valve operates to discharge air from both the train pipe and the auxiliary reservoir, directly through the triple valve emergency ports 40 and 41 into the brake cylinder, without reference to port 39, annular passage 17, the connecting pipe and port 19 of the reducing valve, whereby a high pressure quickly accumulates in the brake cylinder, in pipe 6 and the reducing valve chamber above piston 10, which compresses spring 13 and forces piston 10 and slide valve 11 downward to the limit of their movement, thereby not only closing port 19 but also opening port 21 and, through pipe 8, bringing chamber 23 of the inertia governor device into direct communication with the brake cylinder. Valve 24 of the inertia governor device then controls the discharge of air from the brake cylinder. Whatever the pressure in the brake cylinder may be, no further operation of the apparatus takes place unless or until the friction of the brake shoes, resulting from such brake cylinder pressure, shall cause the rate of retardation for which the inertia governor device is adjusted; whenever the fixed rate of retardation is reached the resistance of the inertia of weight 28 to such retardation overcomes the obstruction to independent motion and causes the lever 29 to rotate about the forward one of the fulcrum bolts 31 or 32, raising lever 36, which thereby engages stem 26 and forces valve 24 upward from its seat. Thereupon, the air in the brake cylinder is promptly discharged through pipe 6, port 21, pipe 8, chamber 23 and underneath valve 24 to the atmosphere. This discharge is very rapid and continues until the pressure and friction of the brake shoes are, in consequence, correspondingly reduced, and the rate of retardation sufficiently declines to cause the weight 28 to return to its normal position and restore valve 24 to its seat. Should the rate of retardation again equal the fixed limit at any subsequent period of the stop, the valve 24 will again be similarly opened and the air pressure in the brake cylinder will again be promptly reduced until a sufficient consequent reduction of the rate of retardation has occurred to avert any danger of sliding the wheels upon the rails. By provision of ports and valves of suitable area it is quite possible with the present form of construction of the inertia governor device to provide for such rate of reduction of air pressure, in the largest sized brake cylinder, that it would be impossible for the rate of retardation to increase or to continue undiminished in spite of such discharge, and wheel sliding is thereby positively prevented. The maximum discharge of air required, from the largest sized brake cylinder in order to reduce the maximum air pressure thereof to the interior limit, may take place in the fraction of a second, without interfering with the delicacy of the adjustment and operation of the inertia governor device, constructed as shown in Fig. 2, and however great the maximum emergency air pressure provided for the brake cylinder may be it will be promptly limited, by the operation of the inertia governor device, to that which is sufficient to produce the required brake resistance, with the comparatively high coefficient of brake shoe friction of any inferior speed, without danger to the wheels from sliding.

According to my improvement in the triple valve, as shown in Fig. 5, the piston and slide valve of the triple valve are similar to those of the old standard construction, except that by shortening the angular slot 40 of the slide valve communication between the auxiliary reservoir and port 41 is not opened in the excessive full service position, Fig. 5, while at the same time, if found desirable to still continue communication between the auxiliary reservoir and the reducing valve chamber in this position, after port 39 has been closed, port 43 may be added, through the triple valve bushing, (see Fig. 6), in such a position that it shall be uncovered by slot 40, and thereby permit the auxiliary reservoir air to pass through annular passage 17, the connecting pipe 15, pipe connection 14 and through passage 18 and port 19, into the reducing valve chamber. In the emergency application of the brakes it is very well known that the piston and slide valve of the triple valve are caused to move with great rapidity, and while the triple valve piston 48 moves into the position shown in Fig. 5 in both full service and emergency applications, the slide valve in service applications is drawn slowly into the position shown in Fig. 5, with graduating valve 47 open, but in emergency applications the movement of said slide valve continues until the seating of the graduating valve 47 suddenly arrests it in the position shown in Fig. 6, whereby port 41 is uncovered by the angular slot 40, and the auxiliary reservoir air is thereby given access to the emergency piston 42, which performs the function, in emergency applications, of providing communication between the auxiliary reservoir and the brake cylinder. Port 44, through the emergency piston, and lateral ports 45, through the stem of the emergency piston, may be provided, to give abundant passage way for such purpose.

Having now described my invention, what I claim as new and desire to secure by Letters Patent, is:—

1. In a fluid pressure brake system, the combination of an auxiliary reservoir, a brake cylinder, a quick acting triple valve, a pressure reducing valve, controlling a passage from the triple valve service port to the brake cylinder, whereby the brake cylinder air pressure is limited in service applications of the brakes, and an inertia governor, controlling the brake cylinder air pressure in emergency applications of the brakes.

2. In a fluid pressure brake system, the combination of an auxiliary reservoir, a brake cylinder, a quick action triple valve, a pressure reducing valve, controlling a passage from the auxiliary reservoir to the brake cylinder, whereby the brake cylinder air pressure is restricted to a fixed, moderate limit, in service applications of the brakes, and an inertia governor, operated by a fixed rate of retardation, for controlling the brake cylinder air pressure, so that the retardation caused by the resulting brake shoe friction, cannot exceed the said fixed rate in emergency applications of the brakes.

3. In a fluid pressure brake system, the combination of an auxiliary reservoir, a brake cylinder, a quick action triple valve, a pressure reducing valve, controlling a passage from the auxiliary reservoir to the brake cylinder, whereby the brake cylinder air pressure is subjected to a moderate, fixed limit in service applications of the brakes, and an inertia governor, operated by a fixed rate of retardation, for controlling a brake cylinder relief valve, whereby the brake cylinder air pressure is so limited that the retardation of the brake shoe friction, resulting thereby, cannot exceed the said fixed rate, in emergency applications of the brakes.

4. In a fluid pressure brake system, the combination of a train pipe, an auxiliary reservoir, a brake cylinder, a quick action triple valve, having a passage leading from the auxiliary reservoir to the brake cylinder in service applications of the brakes only, and another passage leading from both the train pipe and the auxiliary reservoir to the brake cylinder in emergency applications of the brakes only, a pressure reducing valve, controlling the passage from the auxiliary reservoir to the brake cylinder in service applications, and limiting the brake cylinder air pressure thereby, and an inertia governor, operated by a fixed rate of retardation, which controls the air pressure in the brake cylinder, from the train pipe and auxiliary reservoir, in emergency applications of the brakes.

5. In a fluid pressure brake system, the combination of an auxiliary reservoir, a brake cylinder, a quick action triple valve, having separate passages for the air from the auxiliary reservoir to the brake cylinder in service applications and in emergency applications of the brakes and adapted to open the latter passage only under a sudden reduction in train pipe pressure, and a pressure reducing valve, which controls one of said passages from the auxiliary reservoir to the brake cylinder, whereby the brake cylinder air pressure is restricted to a moderate, fixed maximum in service applications of the brakes, which cannot be exceeded except in emergency applications of the brakes alone.

6. A quick action triple valve device comprising a main slide valve, and a piston and graduating valve having a lost motion relative to the main valve, said main valve provided with an emergency port adapted to remain closed under an excessive service reduction in train pipe pressure but opened by the momentum of the main valve under a sudden reduction in train pipe pressure.

7. A quick action triple valve device, comprising a main slide valve, and a piston and graduating valve having a lost motion relative to the main valve for graduating the application, said main valve operating at one end of its lost motion under an excessive service reduction in train pipe pressure to hold the quick action emergency port closed, but adapted to be moved by momentum under a sudden reduction to the opposite end of said lost motion to open said emergency port.

8. A quick action triple valve device, comprising a main slide valve, and a piston and graduating valve having a lost motion relative to the main valve for graduating the application, said piston operating under a sudden reduction in train pipe pressure to throw the main valve by its momentum to the outer end of its lost motion and open the quick action emergency port.

9. An inertia governor device, comprising a discharge valve, and an inertia weight having two points of support, one of said supports forming a double fulcrum lever operating to open said valve.

10. An inertia governor device, comprising a discharge valve, an inertia weight having two points of support, a link for supporting the weight at one point, a double fulcrum lever supporting the weight at the other point, and a lever actuated by the double fulcrum lever for opening said valve.

11. In a fluid pressure brake system, the combination of an auxiliary reservoir, a brake cylinder, a quick action triple valve and an inertia governor device controlling a relief valve in a discharge passage from the brake cylinder, and having an inertia weight supported at two points, one being the end of the double fulcrum lever which opens the relief valve, the portion of the weight of the said inertia weight supported by the said lever being so chosen that the resistance of gravity resulting from the opening movement of the valve, shall substantially compensate for the reduction of the resistance of the air pressure upon the relief valve thereby, the same rate of retardation which causes the opening movement of the relief valve being thereby required to maintain the operatively open position thereof, as and for the purpose set forth.

12. In a fluid pressure brake, the combination with a brake cylinder and triple valve, of a pressure reducing valve for limiting the brake cylinder pressure in service applications of the brakes and an inertia governor for controlling the brake cylinder pressure in emergency applications of the brakes.

13. In a fluid pressure brake, the combination with a brake cylinder, triple valve, train pipe, and auxiliary reservoir, of an inertia governor operative only in an emergency application of the brakes for releasing air from the brake cylinder.

In testimony whereof I have hereunto set my hand.

ROBERT A. PARKE.

Witnesses:
J. S. DAVIS,
E. A. WRIGHT.